Figure 4:
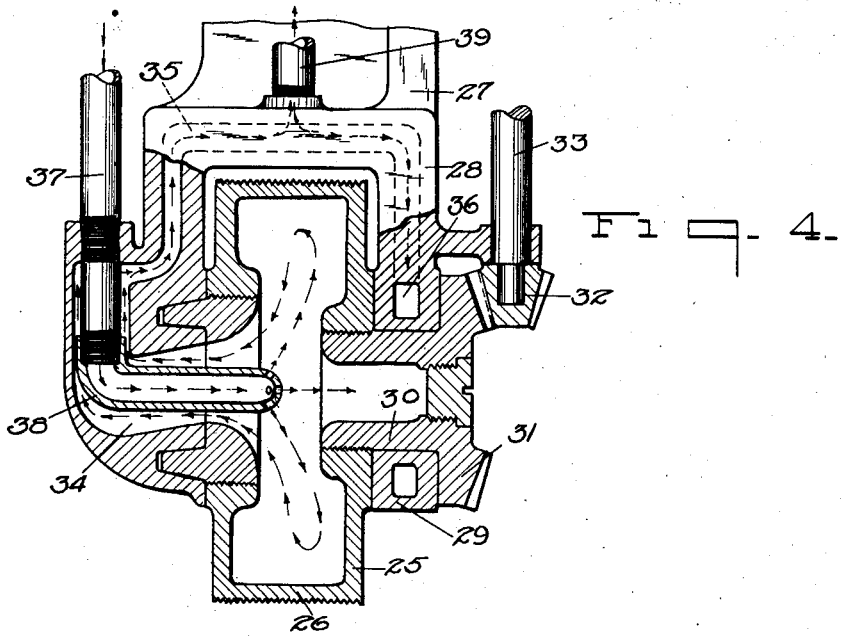

Aug. 29, 1933.  E. T. FERNGREN  1,924,599
METHOD AND APPARATUS FOR DRAWING SHEET GLASS UNDER PRESSURE
Filed Jan. 7, 1925  2 Sheets-Sheet 1
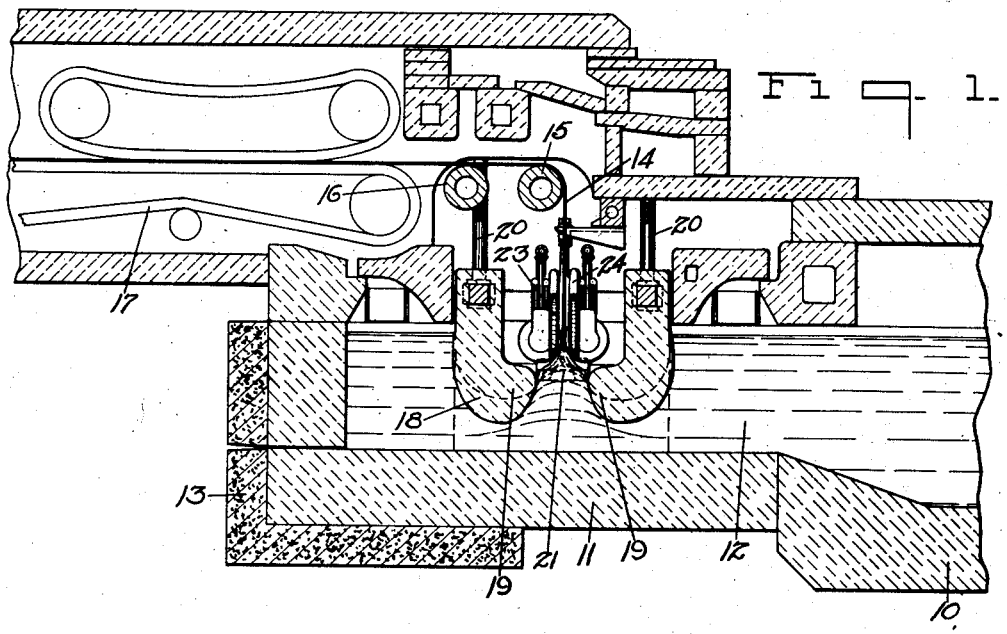
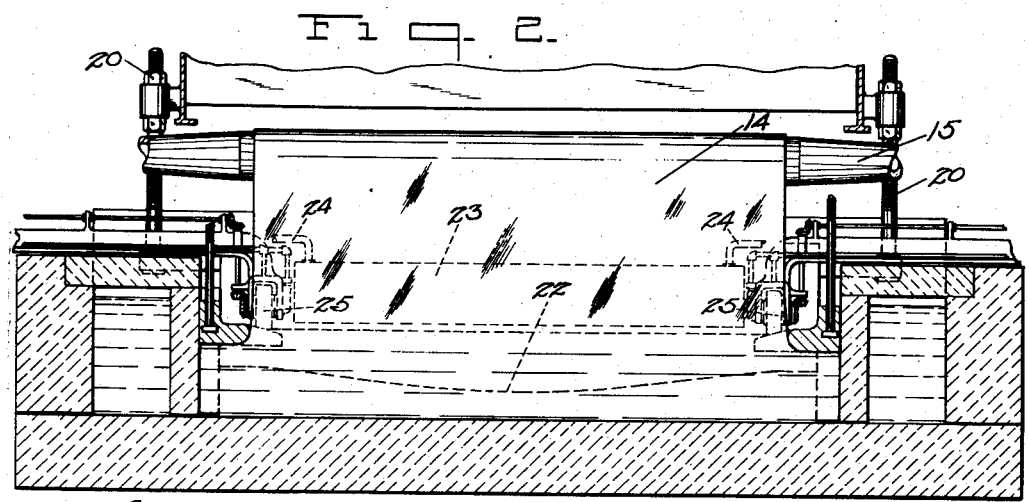
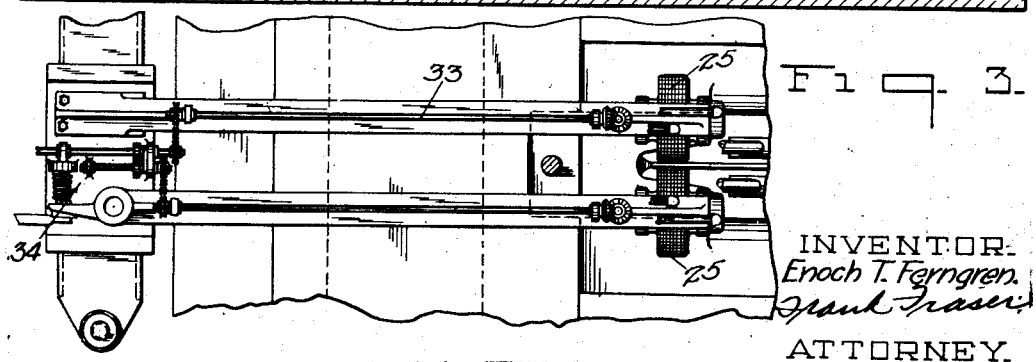
INVENTOR.
Enoch T. Ferngren.
Frank Fraser
ATTORNEY.

Aug. 29, 1933.     E. T. FERNGREN     1,924,599
METHOD AND APPARATUS FOR DRAWING SHEET GLASS UNDER PRESSURE
Filed Jan. 7, 1925     2 Sheets-Sheet 2

INVENTOR.
Enoch T. Ferngren.
ATTORNEY.

Patented Aug. 29, 1933

1,924,599

UNITED STATES PATENT OFFICE 1,924,599

METHOD AND APPARATUS FOR DRAWING SHEET GLASS UNDER PRESSURE

Enoch T. Ferngren, Toledo, Ohio, assignor to Libbey-Owens-Ford Glass Company, Toledo, Ohio, a corporation of Ohio Application January 7, 1925. Serial No. 975

20 Claims. (Cl. 49—17)

The present invention relates to sheet glass apparatus, and has particular reference to means for continuously drawing a sheet of glass from a source of molten glass.

An object of the invention is to provide an apparatus wherein adjustable refractory members are immerged in a pool of molten glass in a manner that an elongated rectangular orifice is formed through which the molten glass by reason of hydrostatic pressure is rapidly forced upwardly forming a sheet source from which, on account of reduced resistance to drawing force, a sheet of glass may rapidly be drawn.

Still another object of the invention is for the purpose of equalizing quantity advance with reference to a sheet supplying body of glass which is hydrostatically actuated through a conduit or enwalled space, and to provide the median portion of the glass body which supplies the median area of the sheet with a greater amount of rigid wall surface relation to the volume of this glass portion so that more clinging surface and also less clearance space for movement be afforded toward the central section of the enclosed space, while at the same time providing less extent of enclosing wall surface for that glass to cling to which is being advanced to subsequently form the marginal section of the sheet.

A still further object of the invention under conditions associated with certain speeds of draw of the sheet is to build sheet edges of suitable thickness and maintain sufficient stress tension therein by means of opposite sets of rollers adapted to advance and deliver the glass forming the edges of the sheet.

Other objects and advantages of the invention will become apparent during the course of the following description.

In the drawings wherein like numerals are employed to designate like parts throughout the same.

Figure 5:
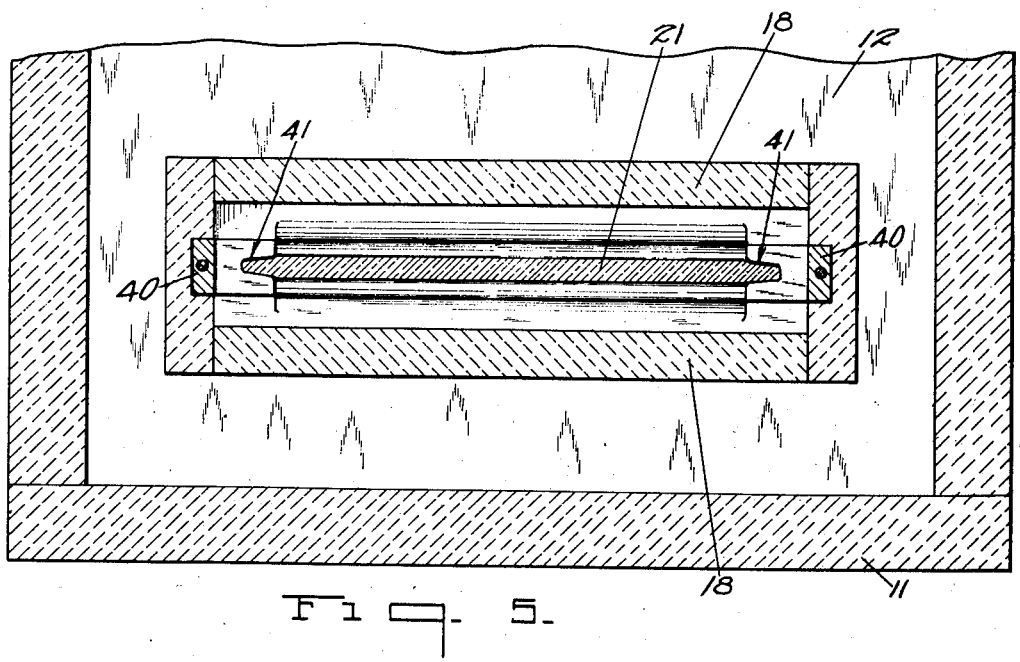

Fig. 1 is a fragmentary vertical longitudinal section showing my improved construction, Fig. 2 is a transverse section thereof, Fig. 3 is a plan view of the sheet edge engaging members and driving mechanism therefor, Fig. 4 is an enlarged section showing the means for internally cooling the sheet edge engaging members, and Fig. 5 is a sectional view of the members submerged in the mass of molten glass to form a slot.

In the drawings wherein for the purposes of illustration is shown the preferred embodiment of the invention, the numeral 10 designates a tank furnace which communicates with a draw-chamber 11 having a source of molten glass 12 therein. The end of the chamber 11 may be insulated as at 13 with any suitable forms of blocks or the like.

The sheet 14 being drawn is preferably drawn in a vertical plane and deflected over a bending roll 15 into a horizontal plane where it passes over an idler roll 16, draw-table 17 and on through any suitable form of annealing leer.

This invention is not necessarily restricted to the type of apparatus herein disclosed as the sheet may be handled in any of the well-known ways after it has been formed in accordance with the present disclosure.

As is shown in the drawings, a pair of refractory blocks 18 having the inwardly extending lips 19 are submerged in the glass 12 in a manner that a relatively wide passage is formed between the two lips 19. The refractory blocks 18 are supported by the jack constructions 20, whereby the blocks may be raised and lowered as desired depending upon the thickness of sheet and the rapidity of draw desired. The blocks 18 being immerged in the glass 12 cause a source of glass 21 to be forced up in said passage under what is known as hydrostatic pressure. The glass being forced up through the narrowest portion or mouth of passage forms what is termed a sheet source from which the sheet 14 may be drawn, and due to the pressure or speed at which the sheet source 21 is being formed because of hydrostatic pressure, it is possible to draw a sheet of glass with great rapidity. The sheet 14 is not drawn from the edges of the orifice formed by the two blocks 18, but is drawn from the center of the sheet source 21 which is formed between said blocks. This is a decided advantage over a construction wherein the sheet is drawn through a relatively narrow slot which is substantially the same width as the thickness of the sheet desired. In drawing the sheet through a slot and from the edges of the slot, lines and other surface defects are caused. By forming a relatively free sheet source and drawing the sheet largely from the center of the source, no surface defects will be caused by reason of the refractory blocks 18. As is shown in Fig. 2 the lower edges 22 of the refractory blocks 18 are curved in a manner that the central portion will be dipped deeper in the pool of molten glass 12 toward the bottom of chamber 11, thus permitting the glass which supplies the edge portions of the sheet to flow with greater ease to equalize the natural tendency of the central flow which is normally somewhat hotter.

As the sheet 14 is drawn with great rapidity and as it is drawn from sub-surface glass it is desirable to utilize heat-absorbing means 23. The heat-absorbing means 23 may be supplied through the pipes 24, and it is to be understood that any form of coolers may be used in this construction.

In addition to the heat-absorbing means, I have designed edge-engaging members which are adapted to engage the edges of the sheet being drawn to facilitate in the rapid draw of sheet and also to prevent narrowing in of the sheet after it has left its sheet source.

Arranged at the ends of the orifice formed by the refractory members 18 are means for creating a drag on the edges of the sheet being formed, and also to control the quantity of glass permitted in the border portions of said sheet. These means comprise the blocks 40 which have the slots 41 formed therein which are of a width substantially the same as the width of the sheet being draw. The sheet being formed is drawn upwardly from the sheet source 21, centrally thereof, and in a manner that the border portion of the sheet source will be subjected to the action of the blocks 40, thus controlling the amount of glass permitted to pass into the sheet edges and also to create sufficient drag to build up a relatively tough and self-sustaining edge which is further conditioned to facilitate rapid drawing of the said sheet.

These edge-engaging means comprise the rolls 25 having preferably the knurled surface 26, and are adapted to be rotatably supported upon the standard 27. The standard 27 is provided with the forked end 28 which terminates in the hollow ring construction 29 which forms a bearing for the shaft 30 to rotate in. The shaft 30 carries a ring gear 31 which meshes with the drive pinion 32 carried by the power shaft 33. The other end of the forked end 28 is adapted to form a passage 34 which communicates with the interior of the wheel 25 and also with the passageways 35 and 36. A conduit 37 carries a nozzle 38 which projects within the interior of the knurled roll 25. A cooling medium such as air or water is introduced through the pipe 37, passes through the nozzle 38, circulates through the roll 25, and passes out through the passageways 34, 35 and 36, and through the discharge pipe 39. The speed of the rolls may be controlled, depending upon the type of sheet being drawn. The shaft 33 is connected to the driving mechanism 34 which is so mounted that the two rolls may be moved toward or away from each other.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a chamber adapted to contain a mass of molten glass, means immerged therein for creating a sheet source below the level of the mass of molten glass, means for drawing a sheet therefrom, means for absorbing heat from the sheet above the sheet source, and means engaging the edges of the sheet, the said heat absorbing means and edge engaging means being also partially disposed beneath the level of the mass of molten glass.

2. In sheet glass apparatus, means containing a mass of molten glass, blocks immerged therein and arranged in spaced relation to create a sheet source therebetween, and means for drawing a sheet therefrom, the said blocks being provided with longitudinally curved lower faces.

3. In sheet glass apparatus, means containing a mass of molten glass, blocks immerged therein and arranged in spaced relation to create a sheet source therebetween, and means for drawing a sheet therefrom, the said blocks dipping deeper into the molten glass at their centers than at their ends.

4. In sheet glass apparatus, means containing a mass of molten glass, means immerged therein for creating a sheet source under pressure, and means for drawing a sheet therefrom, said second named means being dipped deeper into the molten glass at its center than at its ends.

5. In sheet glass apparatus, means containing a mass of molten glass, means for drawing a sheet therefrom, and means immerged in the molten glass for forming, under pressure, a sheet source from which the sheet is drawn and for also equalizing the flow of glass supplied to the center and edge portions of said sheet.

6. In sheet glass apparatus, means containing a mass of molten glass, blocks immerged therein to form a sheet source under pressure between the lower ends thereof and beneath the level of the molten glass, means for drawing a sheet therefrom, and means between the upper ends of the blocks and also beneath the level of the molten glass for engaging the edges of said sheet.

7. The process of drawing flat sheet glass by flowing glass into a shaping slot from different levels at different points, flowing said glass upwardly through said shaping slot, and simultaneously drawing said glass in flat sheet form.

8. A supplying float having substantially parallel spaced walls which project to a lesser depth in the glass bath from the central portion thereof to the end portions of said supplying float.

9. A supplying float having substantially parallel spacing walls which project to greater depth in the hot portions of the bath and to lesser depths to the cooler portions of the bath.

10. A supplying float or die piece for the manufacture of flat sheet glass comprising a refractory body having a slot therein through which the glass passes, the walls of the slot transversely of the sheet projecting at different depths in the bath at different points to compensate for variations in temperature in the glass at the source of the drawn sheet.

11. A slotted glass drawing device adapted to be immersed in a bath of glass and having the lower portions thereof formed irregularly to reach down into different depths of the glass bath whereby to feed to said slotted portion glass at the same temperature from different depths of the bath.

12. In apparatus for drawing sheet glass, a slot member for supplying glass to the base of the drawn sheet, the walls of said slot projecting at different depths at different points in the glass bath.

13. In apparatus for drawing sheet glass, a slot member for supplying glass to the base of the drawn sheet, the walls of said slot projecting at different depths at different points in the glass bath, the portions of the slot adjacent the points where the edges of the sheet are drawn being of less cross sectional area than that of the portion of the slot from which the intermediate portion of the sheet is being drawn.

14. The process of drawing sheet glass from a bath of molten glass, by flowing glass upwardly through a slot and drawing said glass in flat sheet form, restricting the glass passing through the end portions of the slot where the edge and border portions of the sheet are drawn, and supplying glass to the end portions of the slot from higher levels in the bath than to the intermediate portion of the slot where the main body portion of the sheet is being drawn.

15. The process of drawing sheet glass from a bath of molten glass, by flowing glass upwardly through a slot and drawing said glass in flat sheet form, restricting the glass passing through the end portions of the slot to thin down the drawn edges of the sheet while at the same time compensating for the greater cooling influences at the restricted portions of the glass by supplying glass in proportionately adjusted higher temperature at such points than at the center.

16. The process of drawing flat sheet glass from a bath of molten glass which consists in supplying glass to an immersed sheet forming refractory body co-extensive with the base of the sheet and from a greater depth at the middle portion of the body than at the end portions thereof.

17. The process of drawing flat sheet glass from a bath of molten glass which consists in immersing a slotted refractory body in the bath, drawing the sheet from the glass of the bath in line with the slot in said refractory body and causing glass from the bath to pass through the slot to the base of the sheet from a greater depth in the middle portion of the slot than at the end portions thereof.

18. In apparatus for drawing flat sheet glass from a bath of molten glass, an oblong sheet-forming refractory device adapted to be immersed in the bath in line with the base of the sheet glass being drawn, the walls of said refractory device projecting to different depths at different points in the glass bath.

19. In apparatus for drawing sheet glass from a bath of molten glass, a slotted refractory member of greater length than breadth adapted to be immersed in the bath in line with the base of the sheet glass being drawn, the walls of said member progressively extending to a lesser depth in the glass bath from its center to the end portions thereof.

20. In apparatus for drawing sheet glass from a bath of molten glass, a receptacle for containing a bath of molten glass, a relatively long narrow refractory body adapted to be immersed in the glass bath with the end portions thereof adjacent the opposite walls of said receptacle, said refractory body having a slot therein extending substantially throughout the length thereof and coextensive with the sheet being drawn, means for drawing the sheet from the glass in line with the slot, said refractory body extending to a greater depth in the bath in its middle portion than at the ends thereof.

ENOCH T. FERNGREN.